Figure 1:
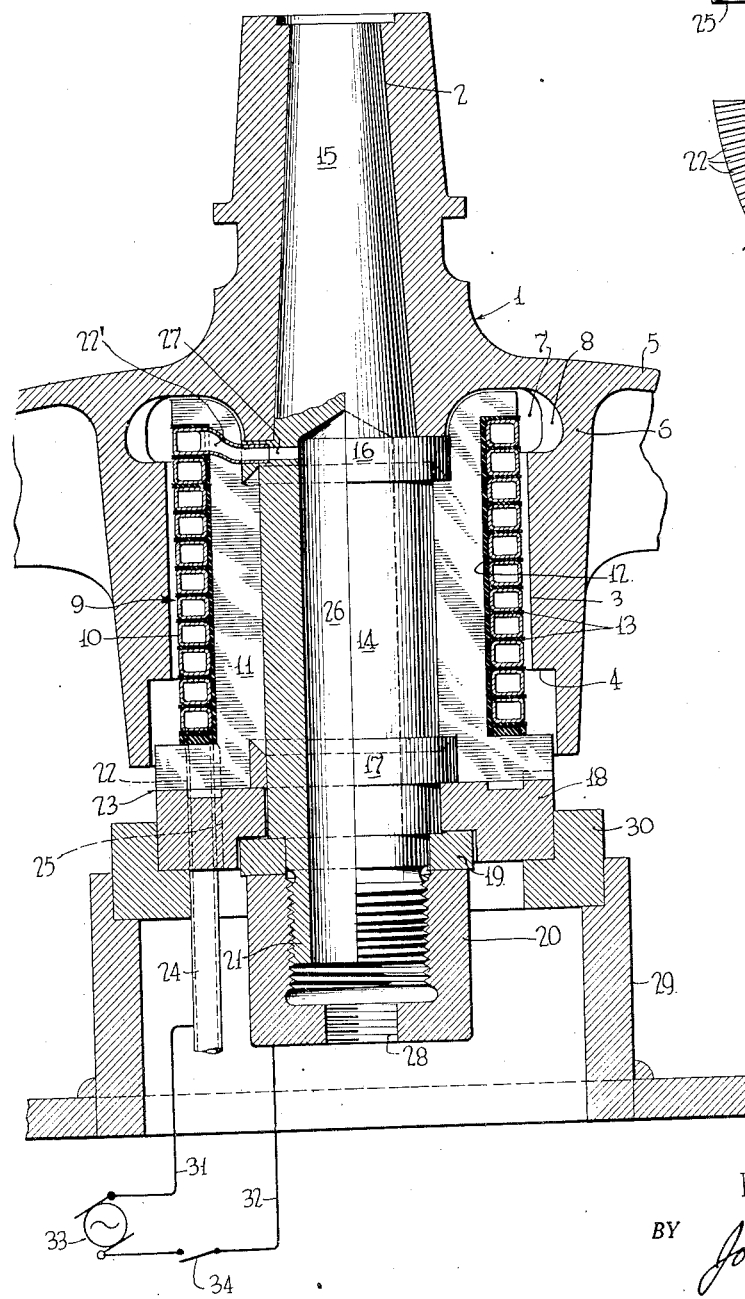

Sept. 23, 1941.    H. E. SOMES    2,256,873
INSIDE INDUCTION HEATER
Filed Nov. 21, 1935    2 Sheets-Sheet 1

INVENTOR.
HOWARD E. SOMES.
BY John P. Sarbox
ATTORNEY

Sept. 23, 1941.  H. E. SOMES  2,256,873
INSIDE INDUCTION HEATER
Filed Nov. 21, 1935  2 Sheets-Sheet 2
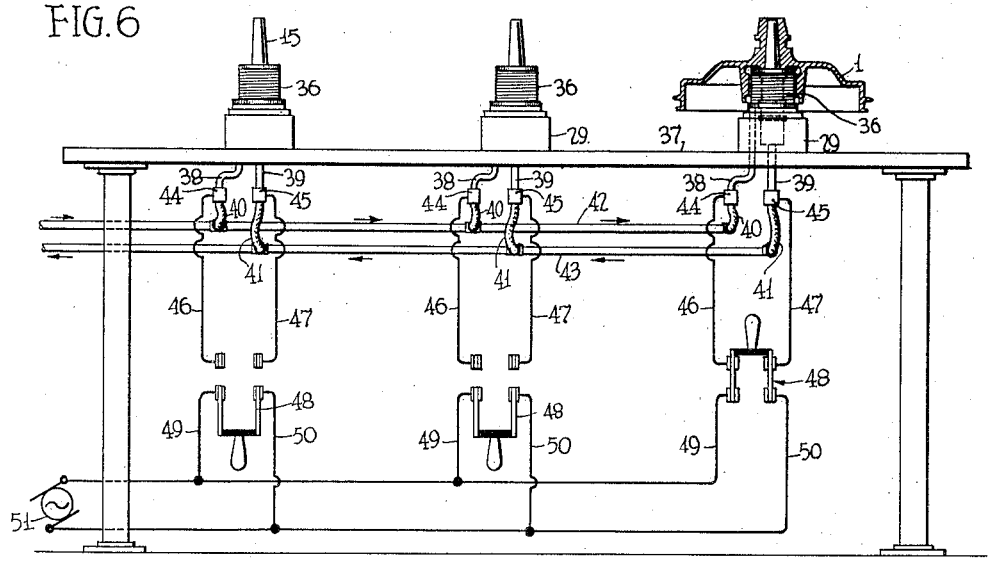
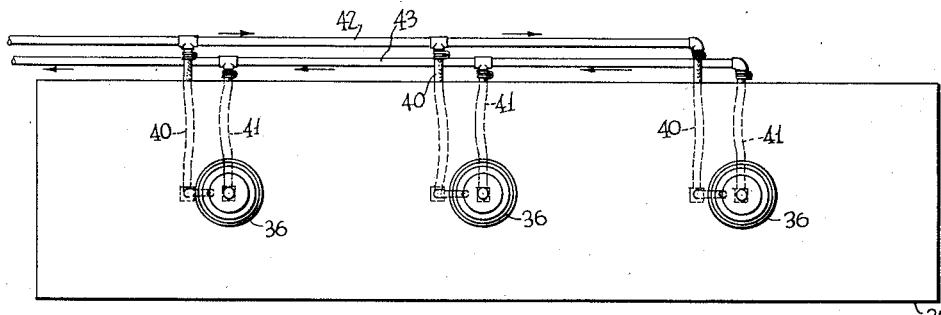
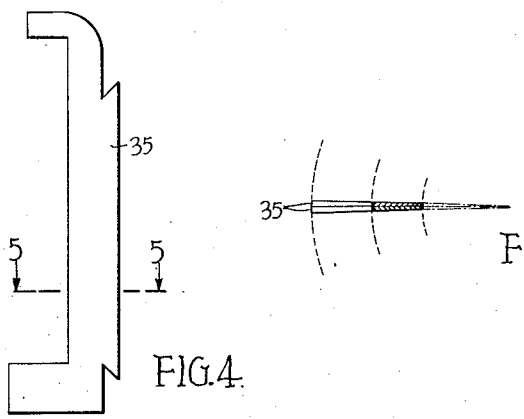
INVENTOR.
Howard E. Somes
BY John P. Tarbox
ATTORNEY.

Patented Sept. 23, 1941

2,256,873

UNITED STATES PATENT OFFICE 2,256,873

INSIDE INDUCTION HEATER

Howard E. Somes, Detroit, Mich.

Application November 21, 1935, Serial No. 50,829

13 Claims. (Cl. 219—13)

The present invention relates in general to the electro-magnetic inductive heating of hollow bodies or the walls of hollow bodies from the inside thereof, for example, either where the walls or other portions to be heated are inaccessible from the outside or where they may be accessible from the outside but it is desired to heat a portion near the inner surface without unduly heating the outer remoter portions.

One practical application of the problem is the heating of the walls of a brake drum for any heat treatment either hardening, normalizing, or annealing, either to accomplish a permanent result or produce an effect useful as an intermediate step in a process, and where the outer surface of the drum is rendered inaccessible for the application of inductive windings as by the presence of ribs, lugs, or other projections, or where it is desired that the heat treatment be more or less restricted to or at least begin at the inner surface.

Another practical application of great value is in the quantity production of automobile hubs, integral hub and brake drum back-plate or integral hub and brake drum, where it is desired to do away with the usual separate internal bearing ring or cylinder of hardened material, by hardening the inner cylindrical portion of the hub so that it may act directly as the bearing surface or bearing race for roller bearings. The problem presented here is to raise the interior portion of the hub to the required temperature before the heat can travel by conduction to the more remote portions in sufficient quantity to unduly raise the temperature of such portions.

It is known to heat the walls of a hollow object or the exterior portion of the walls of a hollow object by electrical induction through the use of a coil surrounding the object, such coil having a magnetic circuit largely of air or non-magnetic material except insofar as the work to be heated, which constitutes a part of the magnetic circuit, may itself be of magnetic material. It has been found that this method is not economically practical for interior heating as above set out, especially where rapid heating of small inside diameters, in the neighborhoood of a foot or less, is required.

Attempts to practice such interior heating with the usual air core type of coil or coreless inductor have met with failure, apparently due to the inability to pass enough current through the coil to do the work required in the time required without destruction of the coil and/or leads.

I have found that ample power input may be attained by providing the primary inducing coil or helix with an internal core of high permeability preferably built up of radial laminations or equivalent structure, resulting in a core highly conductive of magnetic flux but resistant to eddy currents and especially induced currents tending to travel in paths normal to the direction of magnetic flux. When high core temperatures are involved, it is preferable to construct the core of an alloy steel of such composition as to retain its magnetic qualities at high temperatures, for example, a cobalt and nickel steel in which a high percentage of cobalt is used, for example, 70% more or less. The core is so constructed as to form a close magnetic coupling through a minimum air gap with the wall or body portion of the object to be heated, usually of iron or an iron alloy.

This ability to effect a high rate of energy input is essential where the requirement is to harden the inner cylindrical surface of an iron or iron alloy automobile hub while preventing such heating of remoter portions of the hub as would alter its normal or desired qualities.

By shaping the laminated core to surround the inside and end portions of the primary inductor coil, to form with the portion of the iron body to be heated, a substantially complete housing or encasement for the coil, the magnetic flux is confined to such core and portion of the work with the advantageous result that proximate accessories and structural portions of the core such as the lamination locking rings, and centering mandrel for centering the induction heating unit in the hub, are protected from being traversed by a substantial amount of magnetic flux and at least to a degree sufficient to prevent undue inductive heating of such accessories.

In the quantity production of certain articles it has been found possible and highly advantageous to slightly vary the form of the object to be treated, in the present instance a wheel hub, to render it more susceptible to rapid heating by induction with minimum heat and power losses and without the sacrifice of mechanical strength or interference with its intended mechanical functions.

The above and various other objects and advantages of the invention will be more clearly understood from a perusal of the following specification and the drawings accompanying the same.

Figure 2:
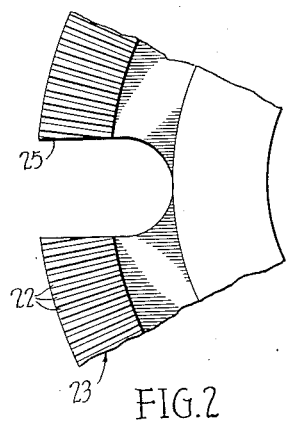
Figure 3:

The invention is illustrated in the accompanying drawings in which:

Figure 1 is a longitudinal axial section of a preferred form of the invention showing a portion of the central core in elevation, Figure 2 is a fragmentary detail view showing a portion of the lamination spacing-ring in elevation, Figure 3 is a fragmentary perspective view on an enlarged scale of a modified form of tubular conductor, Figures 4 and 5 show plan and sectional views, respectively, of a modified form of lamination, Figure 6 is a diagrammatic front elevation of a group arrangement of heating elements, and Figure 7 is a plan view of the apparatus arrangement of Figure 6.

Referring to the drawings in detail, and first to Figures 1 and 2, the invention is here shown applied to the internal heating of an automobile wheel hub for heat treating an inner integral portion designed to act as a bearing race for the wheel.

The hub member 1, may be the hub portion of an integral hub and brake-drum, integral hub and brake-drum back, or simply the hub member of any type of wheel carrying an internal roller-bearing race. The hub is provided with the usual tapered axle barrel 2 at its outer end and a relatively large roller-bearing bore 3 at its inner end, the bearing bore being provided on its inner wall with a radially inwardly projecting portion forming an integral, bearing-race member 4, which in the present instance is to be locally hardened at and near its inner surface by suitable localized heat treatment at and near the inner surface so as to take the place of the usual hardened steel insert, as a bearing-race member.

The hub here shown is of the type carrying an integral brake-drum back, a portion of which near the hub is indicated at 5. The hub has the standard cross sectional contour with certain variations conducive to electro-magnetic inductive heat treatment as hereinafter described, without interference with the desired mechanical functions of the hub or any lessening of its mechanical strength.

This variation from the known form consists mainly in a slight narrowing of the annular section indicated at 6, preferably by outwardly deepening the annular recessed portion 7 and adding strengthening metal in the form of ribs 8 to compensate for the metal taken away, the ribs 8 being arranged to extend longitudinally and axially so as to lie in planes substantially at right angles to the path of induced currents. The portion 6 may also be reduced by taking away a portion of the metal on the outer surface thereof, substituting strengthening ribs arranged to offer the maximum radiating surface and suitably orientated to offer maximum impedance to induced currents. The latter construction may be either alternative to or in addition to the former. However, it will be noted that by outwardly deepening the recess 7 and using the ribs 8 for strengthening, the demarcation of the inwardly extended, annular race portion is accentuated thus aiding in the localization of heat generated therein.

Arranged to fit within the hub and in close spaced relation with the inner surface 3 of the bearing race portion of the hub, is the electromagnetic inductive heating element comprising in general an inductor helix 9 formed of a tubular conductor 10 having a hollow cylindrical, highly permeable, laminated core 11 extending radially outwardly over the top and bottom ends of the helix into close proximity to the inner wall of the wheel hub, the convolutions of the conducting helix being suitably insulated from the core and from each other by a sleeve 12 and washers 13 of mica or other suitable insulating material. It is also contemplated to use in place of either or both the sleeve and washers, insulating enamel of known or other suitable form.

The heating element is sturdily constructed and is carried firmly and strongly on a mandrel support 14, tapered at its upper end 15 to fit snugly into the tapered bore of the hub and provided with a center bore in its lower portion for water cooling as will be hereinafter described. The laminations of the core 11 are arranged radially about the mandrel 14 and clamped in place thereon by means of the upper stationary clamping ring 16 and the lower movable clamping ring 17, the lower clamping ring 17 being clamped upwardly against the laminations through the base ring 18 and foot ring 19 by the hollow clamping nut or cap 20 threaded on to a reduced lower portion 21 of the mandrel 14. For angularly spacing the laminations of the core 11 the lower outer portions of the laminations are nested individually in angularly spaced radial slots 22 from the top of peripheral marginal portion 23 of the base ring 18. The base ring thus holds the laminations on the mandrel in the proper radial arrangement, while the clamping rings 16 and 17 through the dovetail connection with the axially spaced edges of the laminations hold them in good thermo contact with the mandrel, thus greatly facilitating heat exchange between the core and the water-cooled mandrel. The dovetail connections between the clamping rings 16 and 17 also serve to constrain the laminations to uniform annularly aligned disposition about the mandrel 14. The angular spacing of the laminations affords excellent insulation between the laminations at those portions in which the flux density is greatest.

The lower terminal 24 of the conducting helix projects downwardly through an opening 25 in the base ring from which it is air insulated by proper spacing, although suitable solid insulation may be used. This extension is for electrical connection with one terminal of a suitable source of alternating current supply, not shown, and for connection with a suitable source of cooling fluid also not shown, but which may be of any known or other suitable form, while the upper terminal 22' extends into the internal bore 26 of the mandrel, through an opening 27 in the wall of the hollow portion of the mandrel and in fluid tight connection therewith, the electrical connection of the upper coil-terminal to the other side of the current source as well as the fluid path connections, being completed through the mandrel by suitable electrical connection and fluid tight coupling with the clamping nut 20, the lower end of the nut 20 being provided with a tapped opening 28 for this purpose. It is further contemplated to insulate the upper terminal of the helix from the supporting mandrel and laminated core by extending an insulated continuation of the conductor tubing down through the mandrel for outside electrical and fluid connections. The heating element is supported in a supporting base 29 through a seating ring 30.

The parts of the heating element and the article to be treated are so proportioned in relation to each other that when the hub member 1 is set down upon the heating element 2, the heating element will be properly centered and positioned within the hub by means of the tapered upper extension 15 and the upper shoulder of the clamping ring 16 with the outer surface of the convolutions of the conductor helix, or primary inductor, positioned parallel to and in close proximity to the inner surface of the annular bearing portion of the hub to be heat treated, and the helix substantially wholly surrounded or encased, partly by the body material of the hub and partly by the laminated core 11, which latter extends around over the inner surface of the helix and radially outwardly over the top and lower edges, the lower end extension of the core 11 being disposed radially beyond the coil 10 and radially across the radially disposed end face 4 of the hub. It will be clear that the structure here described affords an extreme concentration of the electromagnetic energy with minimum losses through magnetic leakage or dissipation of flux and induced currents. In other words, the arrangement described provides a flux path or magnetic circuit which is comprised substantially in its entirety of the main body of the core and the radial extensions thereof in series with the workpiece to be heated, the radial extensions serving to lead the flux endwise into the particular zone to be heated.

It is to be observed that the current and coolant conducting means for the one end of the coil extend axially within the annulus of the core. One advantage in this is that such means is substantially completely shielded by the core from the inductive heating effect of the coil 10. To add further to this concentration of electro-magnetic energy, especially where high frequencies are used, the tubular conductor composing the conductor helix may take the form shown in Figure 3. In this form the conductor is made with a relatively thick outer wall and relatively thin inner and top and bottom walls, the outer wall functioning mainly as a conductor for the outwardly concentrated energizing current while the inner and top and bottom walls function mainly to hold the cooling fluid. However, in many cases the conductor may be made solid, of rectangular or round cross-section and relatively massive, where the duty cycle is not so severe. To reduce absorption by the conductor of heat radiated from the surface of the work, and thus tend to maintain its current carrying capacity undiminished, the conductor may be plated and buffed on its exposed surface to render its surface highly reflecting. While it is known to effect thermal insulation by reflection, the use of this kind of insulation as and for the purpose herein disclosed, and the arrangement whereby it is utilized is believed to be new and to constitute invention in its conception. A further advantage of the reflecting surface as herein used is that it not only prevents heating of the conductor by absorption of heat radiated from the work but promotes rapid heating of the latter due to the reverberatory effect produced between it and the work. It is preferable to plate the conductor for instance with chromium, the chromium coating being oxidized to secure a film of high electrical insulating value and, after assembly in the heating fixture, to buff, burnish or otherwise polish the exposed surface to secure a highly reflecting surface of high thermal insulating value.

It is further contemplated to increase the flux carrying capacity of the laminated core by tapering the laminations radially inwardly as shown in Figures 4 and 5, so that the laminations 35 will lie in contact along radial planes and form in effect a substantially solid core ring. In this form the laminations would of course be insulated or partially insulated in any known or other suitable manner as by oxidation.

In operation the terminal 24 and the clamping nut 20 which form the electrical terminals of the primary inductor helix are connected through conductors 31 and 32 to a suitable source 33 of alternating current, preferably of high frequency, the duration of connection being controlled by a suitable switch or other current control device indicated diagrammatically at 34. Upon the application of such current, the primary inducing helix is energized to set up a strong magnetic flux concentrated in the core 11 and the annular race portion 4 of the hub. Due to the mechanical and electrical relation of the assembled parts, the induced currents are concentrated at the innermost portion of the bearing portion 4, raising the temperature of the bearing portion to the hardening temperature, after which the current supply is discontinued and the hub removed, and immediately quenched in order to produce the desired local hardening. During energization of the helix 11, heat is dissipated from the heating element by the circulation of a suitable cooling fluid through the hollow conductors of the helix 11 and the central bore 26 of the supporting mandrel 14. As the mandrel 14 is in good thermal contact with the magnetic core 11, heat interchange takes place therebetween cooling the magnetic core. Additional cooling of the core results from the flow of the coolant through the heating coil 10 with the result that the core is cooled both exteriorly and interiorly. The circulation of cooling fluid is preferably maintained continuously so as to continue the cooling off of the heat unit after de-energization of the coil and removal of the hub.

During the heating operation, as the temperature of the extreme inner portion of the bearing portion 4 reaches the recalescence temperature the zone of maximum flux density moves outwardly, but the rate of energy input is made so high that the generation of heat in the outer portion by this outward shift of the zone of maximum flux density, and any undue heating of the outer portion by conduction from the inner portion, will not take place before the inner portion has been raised to the desired hardening temperature. In fact, this temperature rise is effected so rapidly that the outer annular portions and other adjacent portions will remain sufficiently cool to aid in a quenching or cooling of the bearing portion with such outer and adjacent portions remaining well below the hardening temperature so as to preserve the desired mechanical characteristics of the remaining portions of the hub.

It will be noted that dissipation of heat from the upper portion of the bearing ring to the relatively massive upper portion of the hub by conduction through the annular portion 6, is greatly reduced partly because of the reduced section of the portion 6, and partly due to the generation of heat therein which tends to reduce the temperature gradient between the portion 6 and the bearing portion 4 thus retarding heat interchange by conduction.

In the quantity production of articles with portions heat treated in accordance with the present invention, a group of heating units may be arranged to be continuously cooled while being used one at a time in seriatim through the provision of a permanently connected cooling system, preferably common to the group, and means for individually energizing and de-energizing any one of the heaters without interrupting the operation of the cooling means, thus affording ample cooling time for the heating units between operations without loss in production.

Such an arrangement is illustrated diagrammatically in Figures 6 and 7, wherein is indicated a group of the heating elements 36 conveniently mounted upon a suitable support such as the bench 37 with metallic tubular extensions 38 and 39 leading from the coil terminal 24 and tapped terminal 28 (Figure 1) through suitable high resistance or insulating conduits such as rubber hose connections 40 and 41, to input and output cooling fluid manifold connections 42 and 43, respectively. Suitable electrical connection is made between the tubular terminal extensions 38—39 through terminals 44—45, conductors 46—47, switches 48 and conductors 49—50 to a suitable source of alternating current 51.

In operation cooling fluid is continuously supplied to the group of heaters 36 through the manifolds 42—43 from a suitable source, not shown, while the operator places an article such as the integral hub and brake drum 1 on one of the heating elements 36, for example, the one at the extreme right hand end as indicated in Figure 6. The operator then energizes the heater 36 by closure of the extreme right hand switch 48 for the required period of time, after which the switch is opened and the hub 1 removed and quenched. The operator then proceeds to use another of the heaters, for example, the middle heater, and so on through the group of heaters in seriatim, the remaining heaters continuing to cool while not in use.

Although the several heaters are mechanically connected in multiple to the cooling connection manifolds 42—43, they are adequately electrically insulated for individual eelctrical energization through the use of individual cooling connections 40—41 of insulating material such as rubber hose or fabric-reinforced rubber hose or the like, of sufficient length to effectively electrically separate the heaters by the electrical resistance or insulating quality of the cooling fluid. Any known or other suitable method of preventing undue loss of energy through the cooling system may be availed of especially where water is used as the cooling fluid. For example, each heating unit may be provided with a separate and independent cooling system with separate pumps and reservoirs.

Although the switches 48 have been shown as hand operated bipolar knife switches for the sake of simplicity of disclosure, it is desirable in practice to use foot operated switches instead, so that the operator may readily close the circuit immediately after placement of the work and will have his hands free to remove the work immediately after opening the switch. Also any known or other suitable form of timing means may be used for timing the duration of circuit closure, either purely chronometric, or variably in response to magnitude of energy input, temperature rise, etc.

While I have herein shown and described certain specific embodiments of the invention for the sake of definite disclosure, it is to be understood that the invention is not limited to such specific embodiments but contemplates all such modifications and variants thereof as fall fairly within the scope of the appended claims.

What is claimed is:

1. An electro-magnetic induction heater for heating a portion of a hollow body of magnetic material near the interior surface comprising a current-conducting coil arranged to be placed within the hollow body with the outer surface of the coil in close spaced relation to the inner surface of the hollow body, an annular hollow internal open core of magnetic material for said coil extending over the inner surface of the coil and having at least one of its open ends extended radially outwardly across an adjacent end of the coil into close spaced relation to the inner surface of the hollow body adapted to be heated and electrically insulated from said coil, and a power connection for one end of said coil extending axially within the annulus of said core and connected with said coil end, said core shielding said connection throughout its axial extent from the inductive heating effect of said coil.

2. An electromagnetic heater for heating a portion of a hollow body of magnetic material near the interior surface, comprising a current-conducting coil arranged to be placed within the hollow body with the outer surface of the coil in close spaced relation to the inner surface of the hollow body, an annular open internal core of laminated magnetic material for said coil, said magnetic material being laminated substantially radially, a central support extending into said core, and means associated with the edges of said laminations for securing said laminations to said support, said support being of material susceptible to being heated by the inductive heating effect of said coil and being substantially completely shielded by said core from the inductive heating effect of said coil.

3. An electromagnetic induction heater for heating a portion of a hollow body of magnetic material near the interior surface, comprising a current-conducting coil arranged to be placed within the hollow body with the outer surface of the coil in close spaced relation to the inner surface of the hollow body, an internal core of laminated magnetic material, said magnetic material being laminated substantially radially, a hollow central support extending through said core, means for securing said laminations in tight edgewise engagement with said support, and means for circulating a cooling fluid through the hollow support.

4. An electromagnetic induction heater for heating a portion of a hollow body of magnetic material near the interior surface, comprising a current-conducting coil arranged to be placed within the hollow body with the outer surface of the coil in close spaced relation to the inner surface of the hollow body, an internal core of laminated magnetic material, said magnetic material being laminated substantially radially, a central support extending through said core, axially spaced elements on said support having opposed annular dovetail connections with axially spaced portions of each lamination, and means acting through said dovetail connections to firmly and axially clamp said laminations between said axially spaced elements and to constrain said laminations to uniform annularly aligned disposition about said mandrel.

5. An electromagnetic induction heater for heating a portion of a hollow body of magnetic material near the interior surface, comprising a current-conducting coil arranged to be placed within the hollow body with the outer surface of the coil in close spaced relation to the inner surface of the hollow body, an internal core of laminated magnetic material, said magnetic material being laminated substantially radially, a central support extending through said core, axially spaced means on said support having annular dovetail connections with axially spaced portions of each lamination, and means for axially clamping said laminations between said axially spaced means, whereby each lamination is forced into edgewise engagement with said support and cooling means for said support.

6. An electromagnetic induction heater for heating a portion of a hollow body of magnetic material near the interior surface, comprising a current-conducting coil arranged to be placed within the hollow body with the outer surface of the coil in close spaced relation to the inner surface of the hollow body, an internal core of laminated magnetic material, said magnetic material being laminated substantially radially, a central hollow support extending through said core having a shoulder with an annular axially extending recess, and a sleeve arranged thereon having an oppositely axially extending annular recess facing said shoulder recess, said laminations having opposed projections adapted to be engaged in said annular recesses and held in position on said support thereby, said recesses forming a dovetail connection between the support and each lamination, and means for urging said sleeve into engagement with said laminations, whereby each lamination is forced into edgewise engagement with said support, said coil being tubular, means for transmitting cooling fluid through said coil and hollow support, whereby said core may be cooled internally and externally, and for connecting said coil electrically to said support.

7. An electromagnetic induction heater for heating a portion of a hollow body of magnetic material near the interior surface comprising a current-conducting coil arranged to be placed within the hollow body with the outer surface of the coil in close spaced relation to the inner surface of the hollow body, an internal core of laminated magnetic material, a metallic mandrel for said magnetic material having a shank portion thereof extending beyond one end of the coil, an electrical connection between the mandrel and the other end of the coil to electrically connect the other end of the coil to said mandrel, and a supporting means for the heater to which said mandrel is electrically connected.

8. A tool for heating workpieces by electric currents electromagnetically induced, comprising a relatively heavy cross-sectioned mandrel of conducting material adapted to mount the tool upon a support from which it is to be operated, a magnetic core constructed to prevent eddy current heating and mounted on said mandrel, which mandrel and core elements are longitudinally coextensive through a part at least of their lengths, together with a heating coil borne by the core and having its magnetic circuit mainly comprised of the core in series with the workpiece which it is adapted to heat, the coil being spaced from the mandrel at all points by the core, and means for electrically connecting the mandrel and the coil whereby the mandrel serves the coil as a power bus.

9. A device for heating workpieces by electric currents eelctromagnetically induced, comprising a coolant-conducting mandrel adapted to mount the device upon a support from which it is to be operated, a coolant-conducting heating coil coextensive with a substantial part of said mandrel, and an annular open magnetic core constructed to prevent eddy current heating thereof intervened between the coextensive portions of the mandrel and the coil and in heat-conducting relation to the mandrel, said coil being supplied with coolant from said mandrel whereby the said core is cooled both interiorly and exteriorly, said coil having its magnetic circuit comprised substantially in its entirety of said core in series with the workpiece which it is adapted to heat.

10. A tool for heating workpieces by electric currents electromagnetically induced therein, comprising a mandrel hollowed out to constitute it a duct for carrying a coolant, a magnetic core mounted on said mandrel and coextensive with the duct constituted portion throughout a substantial part at least of the core extent, whereby the core is cooled by the passage of coolant through said mandrel, and an inductor heating coil mounted on said core.

11. A tool for heating workpieces by electrically induced currents within their bodies, comprising a mandrel having at one end means for its ready attachment to and removal from a tool support from which it is to be operated, said mandrel being hollowed out and constituted a conduit for conducting a fluid-coolant, a coolant-conducting heating coil supported by said mandrel in juxtaposition to a portion at least of the hollowed-out part of the mandrel, together with electric current and fluid-coolant connections to the coil from said hollowed-out mandrel, and a magnetic core interposed between said coil and mandrel and arranged in heat-conducting relation with respect to the hollowed out portion of the mandrel to be cooled thereby.

12. An inductor adapted to be placed within an opening in a charge piece for internally surface heating a certain zone of said charge piece to a shallow depth, said zone terminating at one end in a radially exposed face, a high frequency high power source of alternating current for energizing said inductor connected thereto, a supporting member, transformer iron core means of annular open type carried by said supporting member, said core means threading said inductor and including a portion disposed radially beyond said inductor and adapted to extend radially across the radially exposed face of the zone to be heated for leading flux into said charge piece enwise of the zone to be heated, the said core with its extension and the charge piece to be heated constituting substantially in entirety the magnetic flux path.

13. A tool of the character described, comprising an annular inductor coil having an external heating face and an internal face, the heating face adapted to be juxtaposed adjacent a workpiece area to be heated, an annular open magnetic core disposed coaxially within said coil and coextensively therewith in supporting relation with respect to said internal face, said core having portions extending axially beyond said coil and terminating in radially outwardly extending portions at the ends of said coil to direct flux endwise into the surface to be heated, and a supporting member for said coil and core extending coaxially through said annular core, said core substantially completely shielding said supporting member from the inductive heating effect of said coil.

HOWARD E. SOMES.